US012709146B2

(12) United States Patent

Oh et al.

(10) Patent No.: US 12,709,146 B2

(45) Date of Patent: Aug. 18, 2026

(54) POWER UNIT FOR FRONT BEAM AXLE

(71) Applicant: Ford Global Technologies, LLC, Dearborn, MI (US)

(72) Inventors: David Oh, Canton, MI (US); David Janson, Plymouth, MI (US); Bryant Poynter, Redford, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 317 days.

(21) Appl. No.: 18/629,417

(22) Filed: Apr. 8, 2024

(65) Prior Publication Data

US 2025/0313078 A1 Oct. 9, 2025

(51) Int. Cl.

*B60K 6/28* (2007.10)
*B60K 6/36* (2007.10)
*B60K 6/445* (2007.10)

(52) U.S. Cl.

CPC ................ *B60K 6/28* (2013.01); *B60K 6/445* (2013.01); *B60K 6/36* (2013.01)

(58) Field of Classification Search

CPC ........................................................ B60K 6/28
See application file for complete search history.

(56) References Cited

U.S. PATENT DOCUMENTS 5,921,338 A * 7/1999 Edmondson ........... B60K 20/04
280/124.111
7,455,135 B2 11/2008 Janson et al.
7,572,201 B2 8/2009 Supina et al.
9,126,581 B2 9/2015 Swales et al.
10,406,916 B2 9/2019 Clarke et al.
10,479,183 B2 11/2019 Nishida
10,766,349 B2 9/2020 Pritchard
11,485,215 B1 * 11/2022 Willison .................. B60K 1/04
11,524,566 B2 12/2022 Pritchard et al.
2010/0108417 A1 * 5/2010 Gilmore ................... B60K 6/52
477/3
2013/0056947 A1 * 3/2013 Moon .................. B60G 21/051
280/124.128
2013/0062850 A1 * 3/2013 Kim ..................... B60G 21/051
280/93.511
2014/0302961 A1 * 10/2014 Downs .................. F16C 33/581
475/230
2018/0050607 A1 * 2/2018 Matecki .................. B60L 50/64
2018/0108891 A1 * 4/2018 Fees ........................ B60L 50/66
2019/0092316 A1 * 3/2019 Yukawa ................... B60K 6/26
2020/0062129 A1 * 2/2020 Hoefner ................... B60K 6/26
2020/0290444 A1 * 9/2020 Maguire ................ B62D 11/16
2020/0358150 A1 * 11/2020 Fields ................... H01M 10/65
2020/0369141 A1 * 11/2020 Handing .................. B60K 1/04
2021/0031836 A1 * 2/2021 Greber .............. H01M 10/6556
2021/0039488 A1 * 2/2021 Ryu ......................... B60K 6/28
2021/0252958 A1 * 8/2021 Engerman ............ F16H 57/042
(Continued)

FOREIGN PATENT DOCUMENTS

DE 102018200948 A1 7/2019

*Primary Examiner* — Erez Gurari

(74) *Attorney, Agent, or Firm* — McCoy Russell LLP

(57) ABSTRACT

Methods and systems for configuring a four-wheel drive high gross weight vehicle are presented. In one non-limiting example, a traction battery covers a lateral expanse between a first frame rail and a second frame rail, thereby providing higher storage capacity for the traction battery even though the vehicle is configured for four-wheel drive.

20 Claims, 16 Drawing Sheets

(56) References Cited

U.S. PATENT DOCUMENTS

| | | | | |
|---|---|---|---|---|
| 2023/0074504 | A1* | 3/2023 | Ellifson | B60G 21/005 |
| 2023/0202294 | A1* | 6/2023 | Engerman | B60K 17/16 74/607 |
| 2023/0264554 | A1* | 8/2023 | Downs | B60K 1/00 180/65.6 |
| 2023/0373245 | A1* | 11/2023 | Pfeffer | B60B 35/003 |
| 2023/0406415 | A1* | 12/2023 | Erber | B60K 1/04 |
| 2024/0208315 | A1* | 6/2024 | Grinstead | B60K 17/356 |
| 2025/0010697 | A1* | 1/2025 | Wood | B60K 1/00 |
| 2025/0187422 | A1* | 6/2025 | He | B60L 50/64 |
| 2025/0313078 | A1* | 10/2025 | Oh | B60K 6/28 |

* cited by examiner

POWER UNIT FOR FRONT BEAM AXLE

BACKGROUND AND SUMMARY

A vehicle may be designed to have a higher towing capacity so that the vehicle may haul loads that are larger than a typical commuter vehicle may haul. Vehicles with higher towing capacity may also be designed differently than vehicles with lower towing capacity. For example, vehicles that have a lower towing capacity may include a unibody structure and coil springs, whereas vehicles that have a higher towing capacity may include body-on-frame construction. Unibody and body-on-frame vehicle configurations have performed well, but with vehicles moving toward higher levels of electrification, existing powertrains and vehicle structures may not be able to meet packaging and performance design objectives. Therefore, it may be desirable to provide a vehicle configuration that accommodates a higher towing capacity and electrification.

The inventors herein have recognized the above-mentioned issues and have developed a vehicle system, comprising: a steerable front beam axle; a rear beam axle; a first vehicle frame rail configured to support a chassis and that extends from the rear beam axle to the steerable front beam axle; a second vehicle frame rail configured to support the chassis and that extends from the rear beam axle to the steerable front beam axle; a power unit configured to generate electric power via output of an internal combustion engine, the power unit also configured to supply propulsive effort to front wheels of the vehicle system; and a traction battery, the traction battery extending continuously laterally between the first vehicle frame rail and the second vehicle frame rail.

By producing a vehicle that includes a traction battery that extends continuously between two frame rails and a power unit that is configured to supply tractive effort to front steerable beam axle, it may be possible to package a power unit and a traction battery in a vehicle having a capacity to tow greater amounts of weight. Further, the traction battery may be of sufficient size to provide electric power to the power unit and an electrified rear axle so that the vehicle may carry heavy loads and operate in four-wheel drive for an extended period of time.

The present description may provide several advantages. Specifically, the approach may enable a vehicle with a higher towing capacity to be a four-wheel drive hybrid vehicle with a traction battery that has a higher charge storage capacity. Further, the approach may lower unsprung vehicle mass, thereby providing a desirable level of vehicle ride quality. Additionally, the approach allows compact packaging for an internal combustion engine and electric machine to be supported via a steerable axle without interfering with steering components.

The above advantages and other advantages, and features of the present description will be readily apparent from the following Detailed Description when taken alone or in connection with the accompanying drawings.

It may be understood that the summary above is provided to introduce in simplified form a selection of concepts that are further described in the detailed description. It is not meant to identify key features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
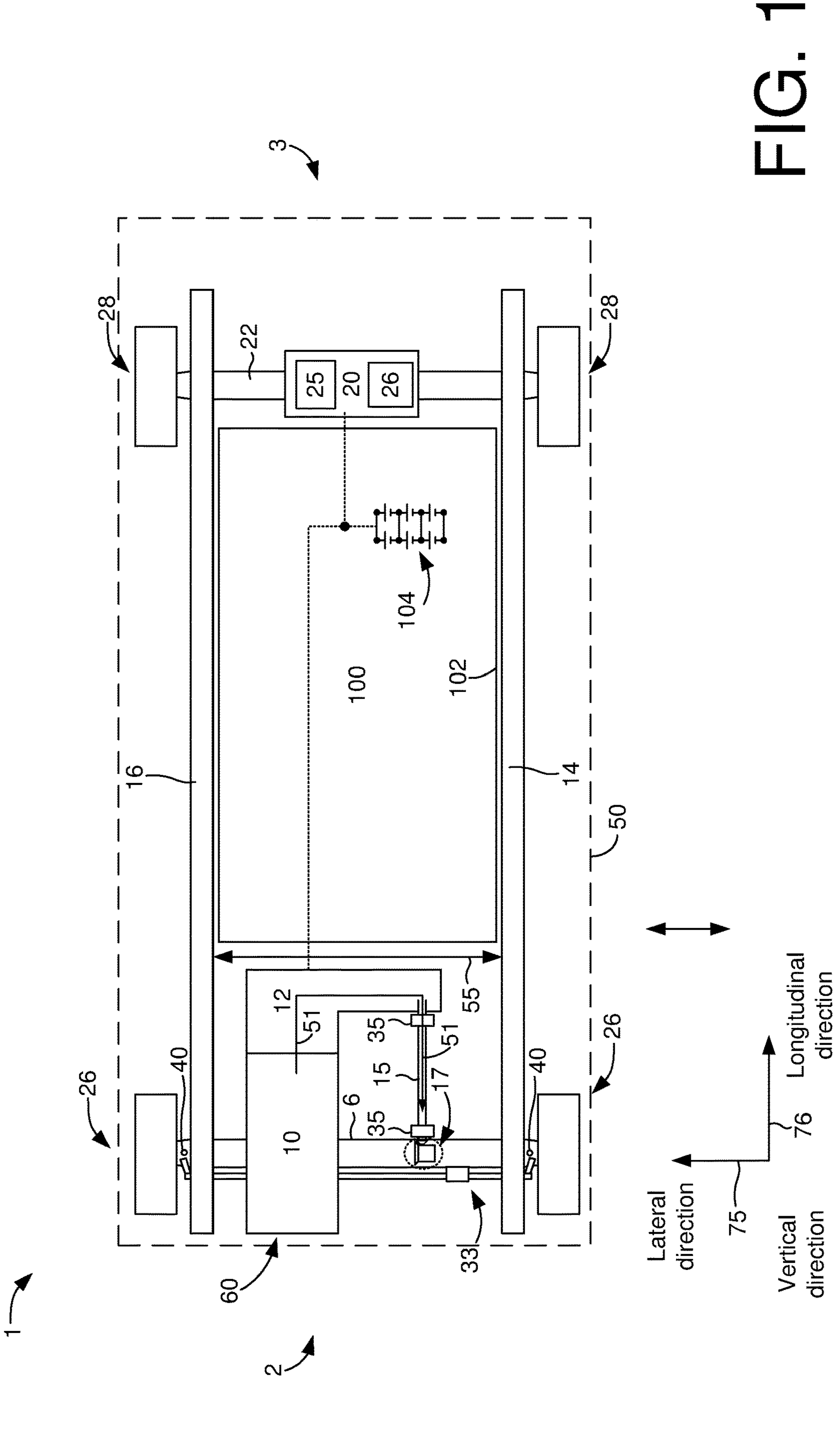
FIG. 1 shows a schematic depiction of a vehicle and powertrain.

The present description is related to a vehicle with a hybrid powertrain that has a higher towing capacity. The hybrid vehicle, as shown in FIG. 1, may include a traction battery 100 including a case or housing 102 that stretches continuously (e.g., without a break or separation in the housing of the traction battery) between a first frame rail and a second frame rail where the traction battery covers at least sixty percent of a lateral distance between a first frame rail and a second frame rail. The hybrid vehicle may include a power unit as shown in one of FIGS. 2-15. The hybrid vehicle may be fabricated according to the method of FIG. 16.

Referring to FIG. 1, a hybrid vehicle 1 is shown. Hybrid vehicle 1 includes a chassis 50, a front side 2, and a rear side 3. Hybrid vehicle 1 may travel in a forward direction with front side 2 leading the hybrid vehicle when the hybrid vehicle is engaged in a forward gear. Hybrid vehicle 1 may travel in a reverse direction with rear side 3 leading the hybrid vehicle when the hybrid vehicle is engaged in a reverse gear.

Hybrid vehicle includes a first frame rail 14 (e.g., a left-hand side frame rail) and a second frame rail 16 (e.g., a right-hand side frame rail) that extend between steerable front beam axle 6 and rear beam axle 22. The first and second frame rails may extend beyond the steerable front beam axle and the rear beam axle, or they may run short of the steerable front beam axle and the rear beam axle. The first frame rail 14 and the second frame rail 16 are configured to support chassis 50 and the frame rails may be coupled to the steerable front beam axle 6 and the rear beam axle 22. Additionally, first frame rail 14 and second frame rail 16 are configured to support traction battery 100, which includes a housing or case that continuously extends between first frame rail 14 and second frame rail 16. Traction battery 100 may extend at least sixty percent of the lateral distance between the first frame rail 14 and the second frame rail 16 as indicated by leader 55. There is an absence of a drive shaft that passes along side traction battery 100 in a longitudinal direction of the vehicle. This arrangement allows the charge storage capacity of traction battery 100 to be increased, thereby increasing the driving range of hybrid vehicle 1. Traction battery includes a plurality of battery cells 104 that are arranged in series and in parallel.

Hybrid vehicle 1 includes a power unit 60 that is mounted in front of traction battery 100 in a longitudinal direction of the hybrid vehicle from the front of the hybrid vehicle to the rear of the hybrid vehicle. Power unit 60 includes an internal combustion engine 10 that is coupled to an electrified transmission 12. Various options for power unit 60 are shown in FIGS. 2-15. Power unit 60 provides a torque path as indicated by arrow 51. Thus, torque path 51 is U-shaped and it may transfer torque in a longitudinal direction from front 1 of hybrid vehicle 1 to rear 3 of hybrid vehicle 1. Further, the direction of torque flow is reversed such that hybrid vehicle 1 may transfer torque in a longitudinal direction from rear 3 of hybrid vehicle 1 to front 2 of hybrid vehicle 1. Torque may be supplied from power unit 60 to universal joints 35, or alternatively, constant velocity joints 35 and drive shaft 15 to front axle differential 17.

Front wheels 26 may pivot about king pins 40 when urged to do so by steering linkage 33. Steering linkage 33 may be mechanically coupled to a steering wheel, or alternatively, a position of steering linkage 33 may be adjusted via an electric motor. Thus, the direction of travel of hybrid vehicle 1 may be changed via adjusting a position of steering linkage 33 and front wheels 26. Power unit 60 may rotate front wheels 26.

Hybrid vehicle 1 is also shown with rear beam axle 22. Rear beam axle 22 is configured with a rear power unit 20 that includes an electric motor 25 and gear set 26. Electric machines in transmission 12 and rear power unit 20 may receive electric power from traction battery 100. Further, when operating in a generator mode, transmission 12 and/or electric motor 25 may supply electric charge to traction battery 100. Electric motor 25 may rotate rear wheels 28.

Lateral direction of hybrid vehicle 1 is indicated by arrows 75 and a longitudinal direction of hybrid vehicle 1 is indicated by arrows 76.

Figure 2:
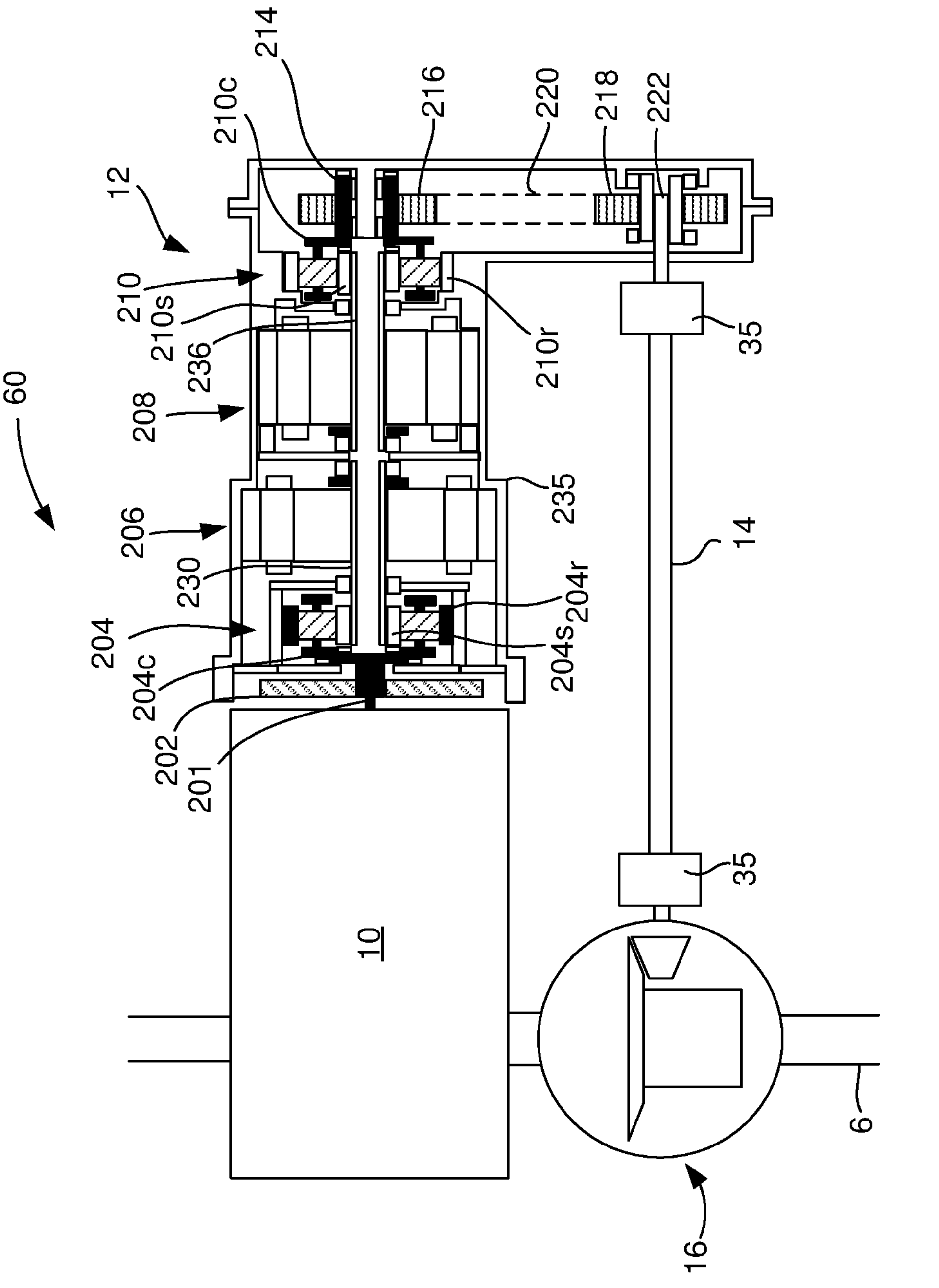
FIGS. 2-15 show various embodiments of a powertrain that may be including in the vehicle of FIG. 1.

Referring now to FIG. 2, a cut-away diagram of a first example of power unit 60 is shown. In this example power unit, internal combustion engine 10 is directly coupled (e.g., no intervening shafts or gears) to input shaft 201 and input shaft 201 is directly coupled to damper 202. Damper 202 is directly coupled to carrier 204*c* of first planetary gear set 204. First planetary gear set 204 also includes a ring gear 204*r* that is directly coupled to transmission case 235. Further, sun gear 204*s* of first planetary gear set 204 is coupled to first intermediate shaft 230. First intermediate shaft 230 couples first planetary gear set 204 to generator 206. Generator 204 may supply electrical charge to traction battery 100 shown in FIG. 1 and/or motor 208 when a rotor of generator 204 is rotated via internal combustion engine 10. Generator 204 is not mechanically coupled to motor 208 in this example.

Motor 208 is a traction motor that may provide propulsive effort to front wheels 26 as shown in FIG. 1 via steerable front beam axle 6. Motor 208 is directly coupled to sun gear 210*s* of second planetary gear set 210 via second intermediate shaft 236. Carrier 210*c* of second planetary gear set 210 is directly coupled to third intermediate shaft 214 and third intermediate shaft 214 is directly coupled to first chain drive sprocket 216. Chain 220 mechanically couples first chain drive sprocket 216 to second chain drive sprocket 218. Second chain drive sprocket 218 is directly coupled to output shaft 222 and output shaft 222 is directly coupled to universal joint 35.

In this configuration, power unit 60 may receive an input torque via internal combustion engine 10 and convert the torque to electric charge via generator 204. The electric charge may be delivered to traction motor 208 and/or traction battery 100. Traction motor 208 may provide torque to provide propulsive effort to front wheels 26 by way of chain 220 and its associated gears.

The first planetary gear set 204 operates as a reduction gear between internal combustion engine 10 and generator 204. Second planetary gear set 210 operates as a reduction gear between motor 208 and third intermediate shaft 214.

Figure 3:
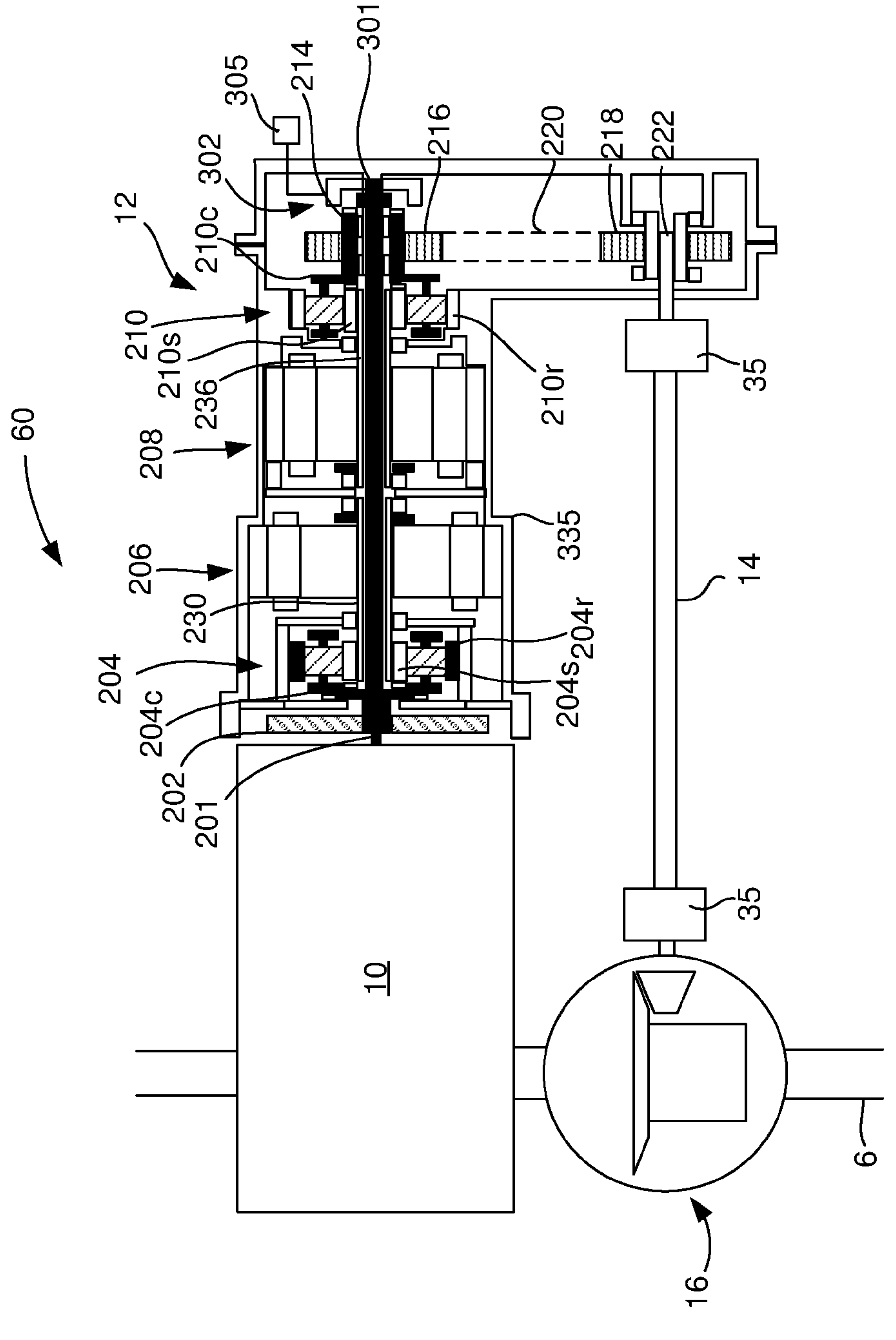

Referring now to FIG. 3, a cut-away diagram of a second example of power unit 60 is shown. In this example, many of the components shown in FIG. 2 are shown in FIG. 3. Components in FIG. 2 that are the same as components shown in FIG. 3 are labeled with the same numerical identifiers. For example, input shaft 201 of FIG. 2 is indicated as input shaft 201 in FIG. 3. Therefore, for the sake of brevity, the description of the same components is omitted.

In this example, an engine direct drive shaft 301 is positioned within first intermediate shaft 230 and second intermediate shaft 236. Third intermediate shaft 214 is not included and coupler 302 may selectively couple engine direct drive shaft 301 to first chain drive sprocket 216 and second intermediate shaft 236. Coupler 302 and engine direct drive shaft 301 may allow engine to supply torque directly to first chain drive sprocket 216, which in turn may allow internal combustion engine to rotate front wheels 26 shown in FIG. 1. Coupler 302 may be selectively engaged and disengaged via actuator 305. Thus, internal combustion engine 10 and traction motor 208 may simultaneously provide torque to first chain drive sprocket 216. Further, internal combustion engine 10 may supply torque to front wheels 26 shown in FIG. 1 and generator 204 simultaneously so that the traction battery may be charged while internal combustion engine 10 is propelling the hybrid vehicle 1 shown in FIG. 1.

Figure 4:
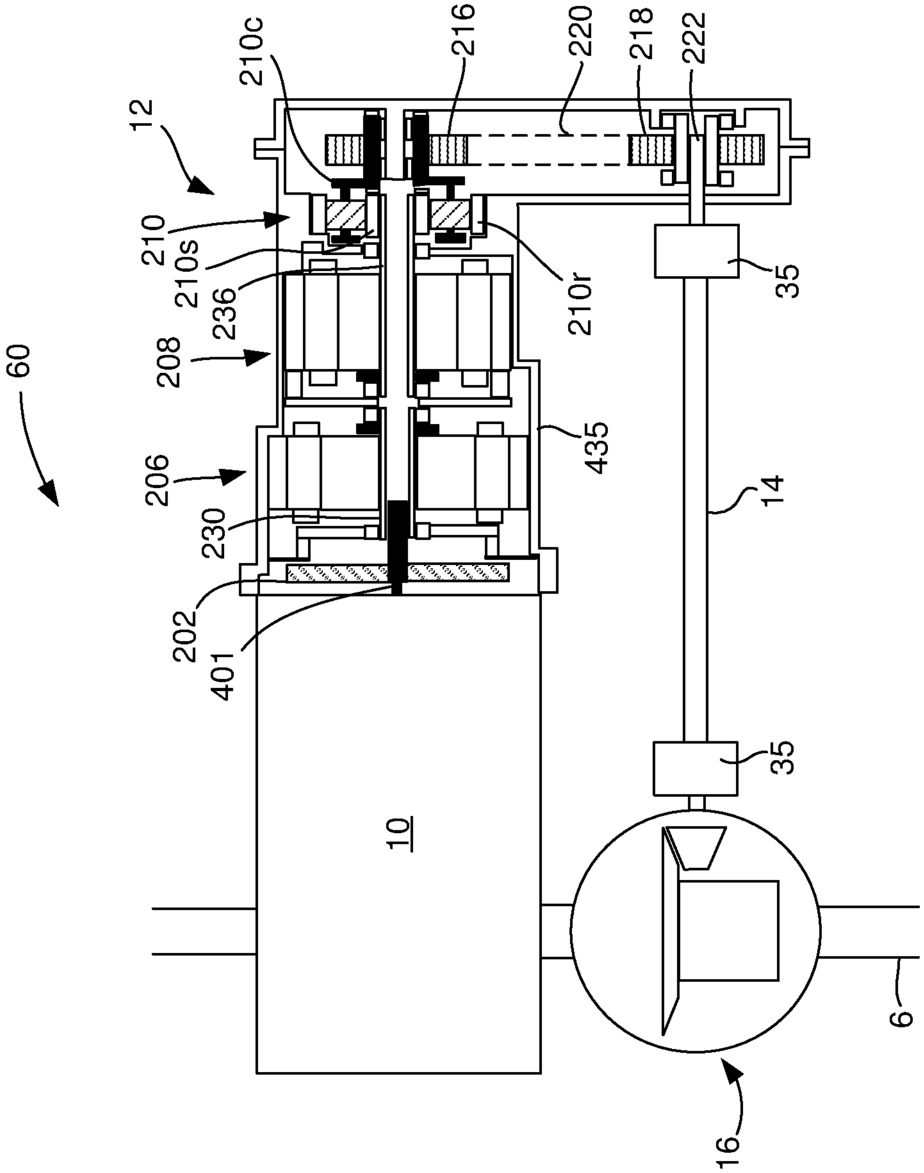

Referring now to FIG. 4, a cut-away diagram of a third example of power unit 60 is shown. In this example, many of the components shown in FIG. 2 are shown in FIG. 4. Components in FIG. 2 that are the same as components shown in FIG. 4 are labeled with the same numerical identifiers. For example, motor 208 of FIG. 2 is indicated as motor 208 in FIG. 4. Therefore, for the sake of brevity, the description of the same components is omitted.

In this example, first planetary gear set 204 has been removed and input shaft 401 directly couples internal combustion engine 10 with generator 206. This configuration allows internal combustion engine to rotate at a same speed as generator 206.

Figure 5:
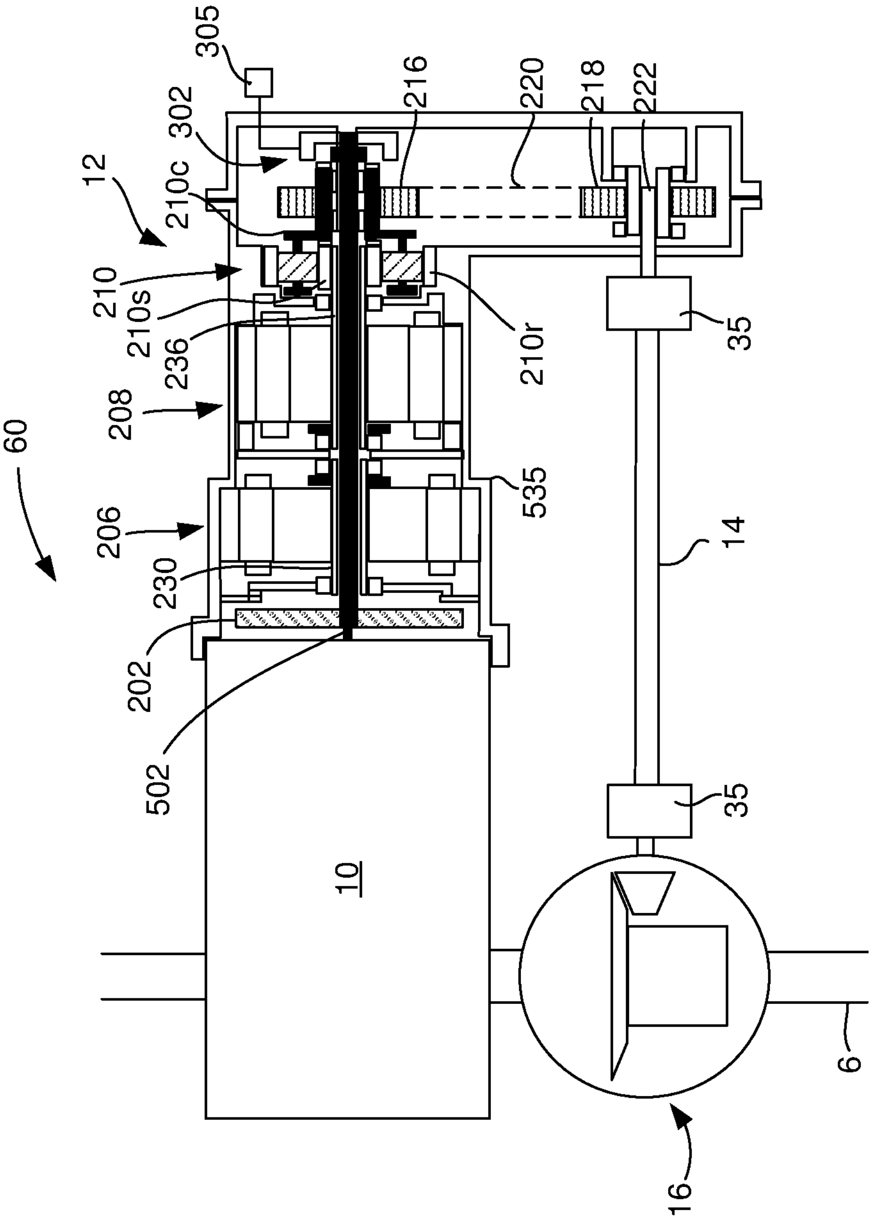

Referring now to FIG. 5, a cut-away diagram of a fourth example of power unit 60 is shown. In this example, many of the components shown in FIGS. 2 and 3 are shown in FIG. 5. Components in FIGS. 2 and 3 that are the same as components shown in FIG. 5 are labeled with the same numerical identifiers. For example, motor 208 of FIG. 2 is indicated as motor 208 in FIG. 5. Therefore, for the sake of brevity, the description of the same components is omitted.

In this example, first planetary gear set 204 has been removed and input shaft 502 directly couples internal combustion engine 10 with damper 202. Input shaft 502 extends through first intermediate shaft 230 and second intermediate shaft 236. Input shaft 502 may be selectively coupled to first chain drive sprocket 216 via coupler 302. Thus, the configuration of FIG. 5 omits the gear reduction shown in the configuration of FIG. 3.

Figure 6:
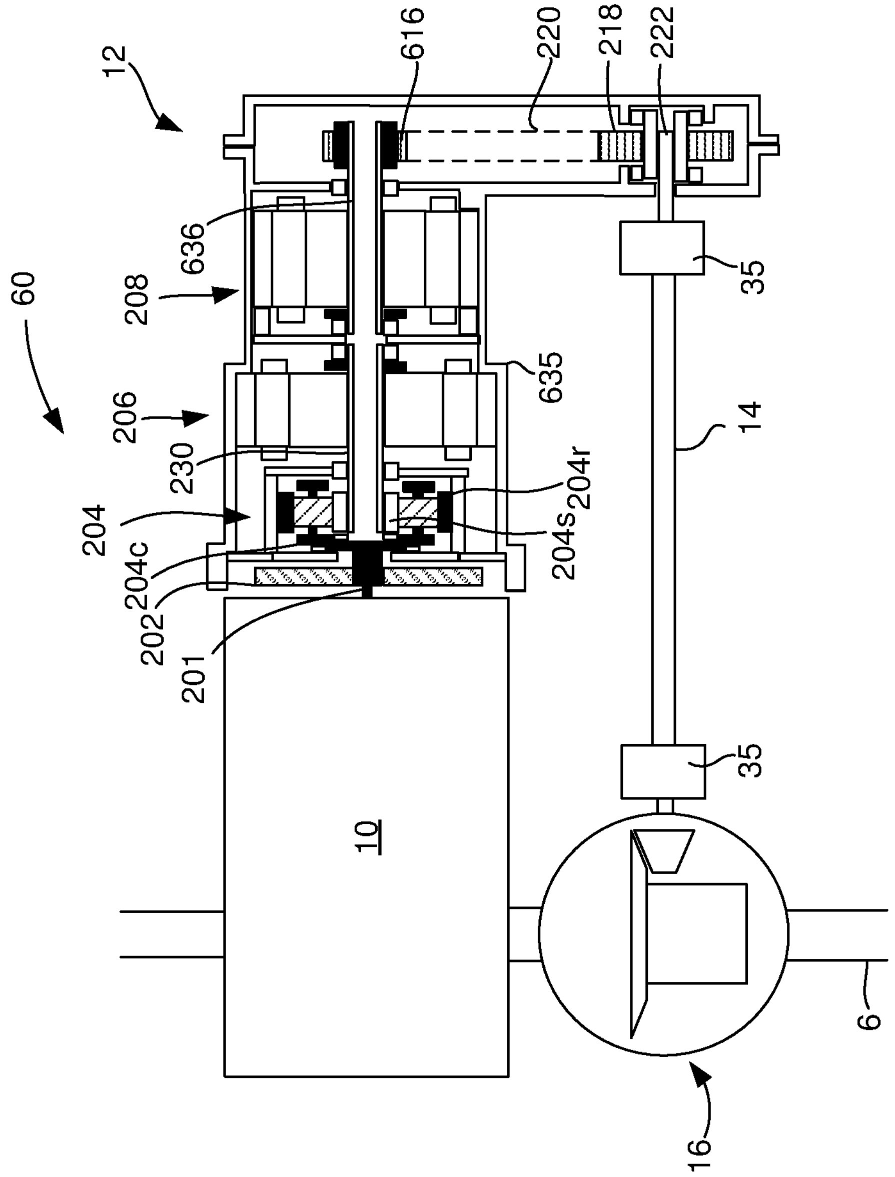

Referring now to FIG. 6, a cut-away diagram of a fifth example of power unit 60 is shown. In this example, many of the components shown in FIG. 2 are shown in FIG. 6. Components in FIG. 2 that are the same as components shown in FIG. 6 are labeled with the same numerical identifiers. For example, input shaft 201 of FIG. 2 is indicated as input shaft 201 in FIG. 6. Therefore, for the sake of brevity, the description of the same components is omitted.

In this example, the second planetary gear set 210 shown in FIG. 2 has been removed. A revised second intermediate shaft 636 directly couples the motor 208 to a reduced diameter first chain drive sprocket 616. Thus, the second planetary gear set 210 has been removed such that the motor drives the reduced diameter first chain drive sprocket 616 without a gear reduction.

Figure 7:
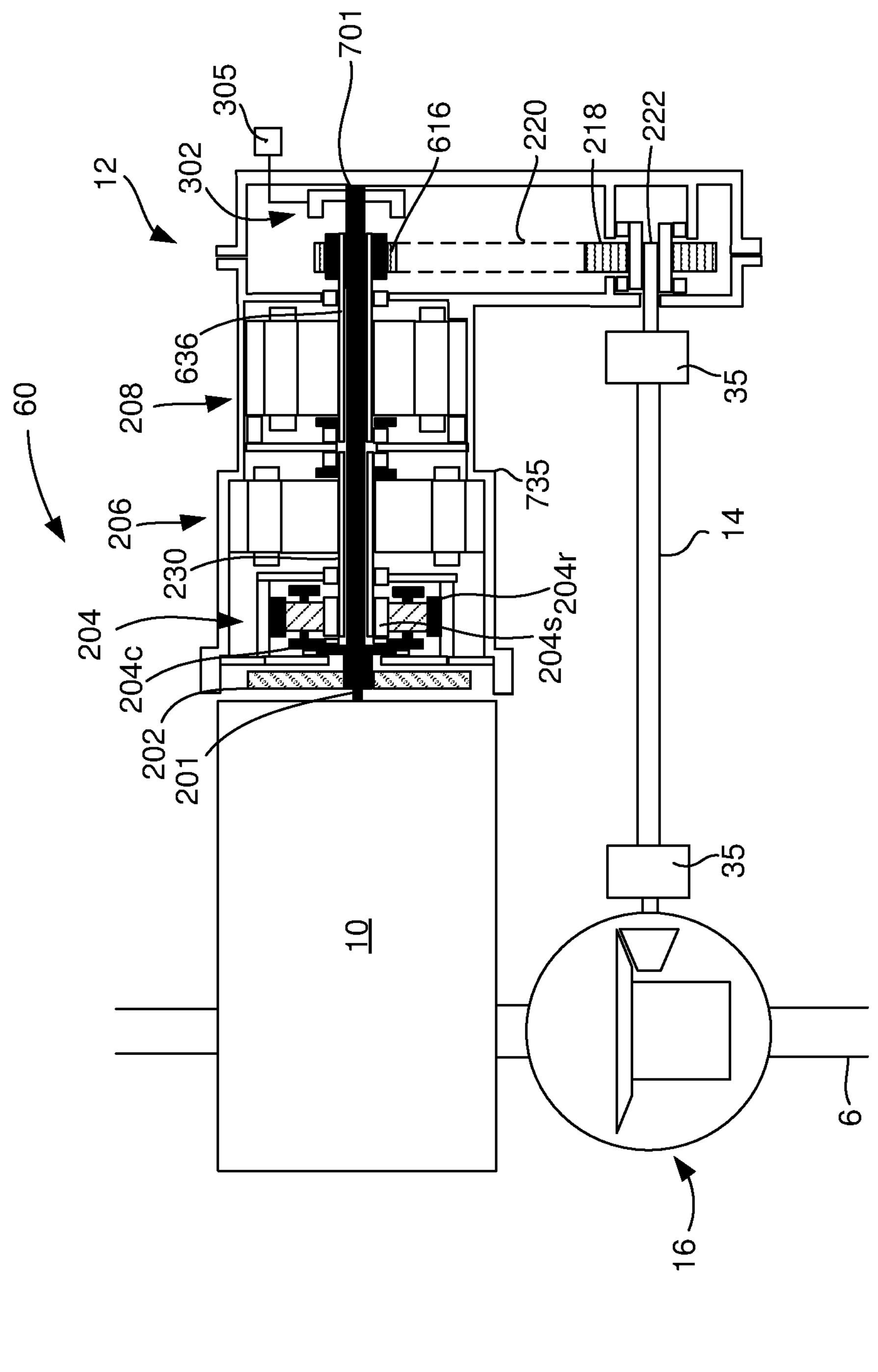

Referring now to FIG. 7, a cut-away diagram of a sixth example of power unit 60 is shown. In this example, many of the components shown in FIGS. 3 and 6 are shown in FIG. 7. Components in FIGS. 3 and 6 that are the same as components shown in FIG. 7 are labeled with the same numerical identifiers. Therefore, for the sake of brevity, the description of the same components is omitted.

In this example, second planetary gear set 210 has been removed and engine direct drive shaft 701 extends from carrier 204*c* to first chain drive sprocket 616. Engine direct drive shaft 701 extends through first intermediate shaft 230 and second intermediate shaft 636. Engine direct drive shaft 701 may be selectively coupled to first chain drive sprocket 616 via coupler 302. Thus, the configuration of FIG. 7 omits the gear reduction shown in the configuration of FIG. 3 and provides a direct engine drive capability.

Figure 8:
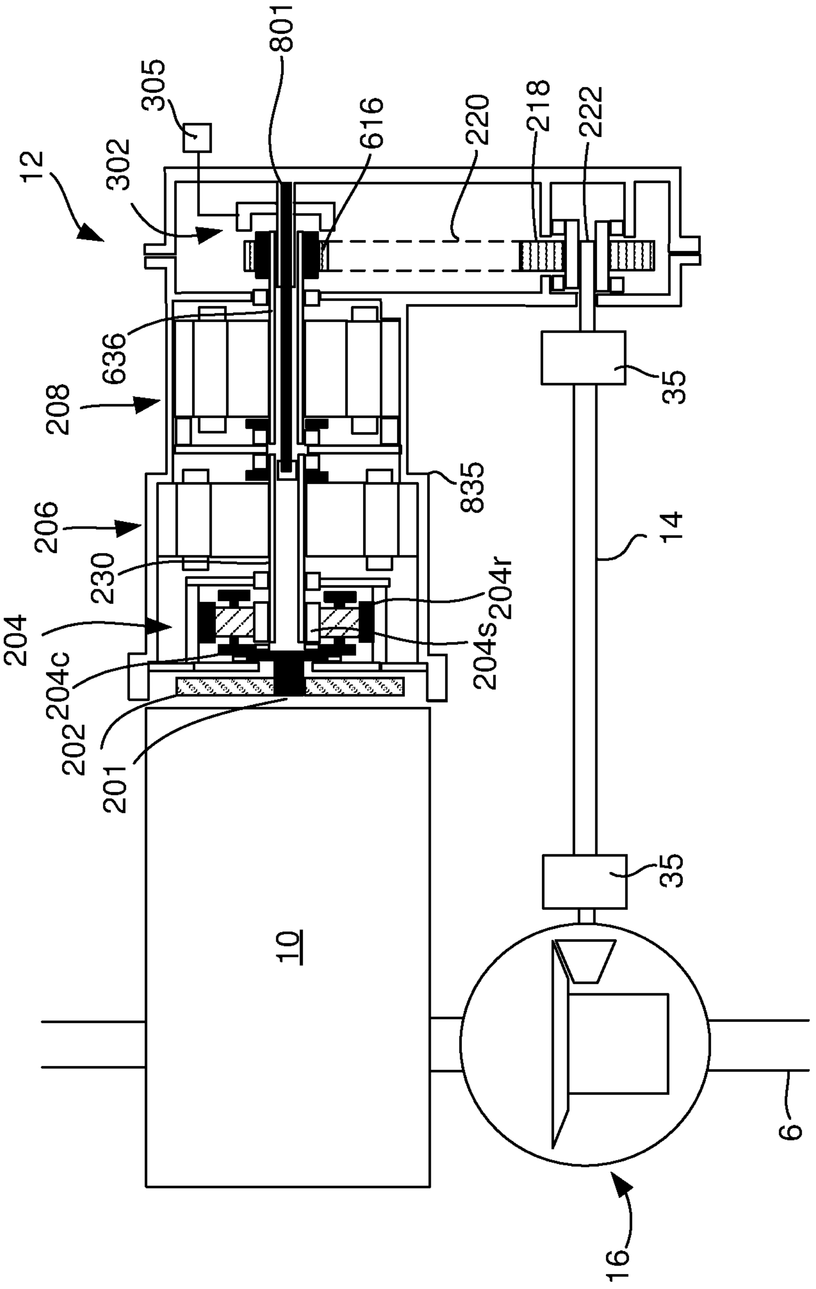

Referring now to FIG. 8, a cut-away diagram of a seventh example of power unit 60 is shown. In this example, many of the components shown in FIG. 7 are shown in FIG. 8. Components in FIG. 7 that are the same as components shown in FIG. 8 are labeled with the same numerical identifiers. Therefore, for the sake of brevity, the description of the same components is omitted.

In this example, like the example in FIG. 7, second planetary gear set 210 has been removed. However, in this example, an engine direct drive shaft 801 extends from first intermediate shaft 230 to first chain drive sprocket 616. Input shaft 502 directly couples internal combustion engine 10 with damper 202. Engine direct drive shaft 801 extends from first intermediate shaft 230 and second intermediate shaft 636. Engine direct drive shaft 801 may be selectively coupled to first chain drive sprocket 616 via coupler 302. Thus, the configuration of FIG. 8 includes the gear reduction that is provided via the first planetary gear set 204.

Figure 9:
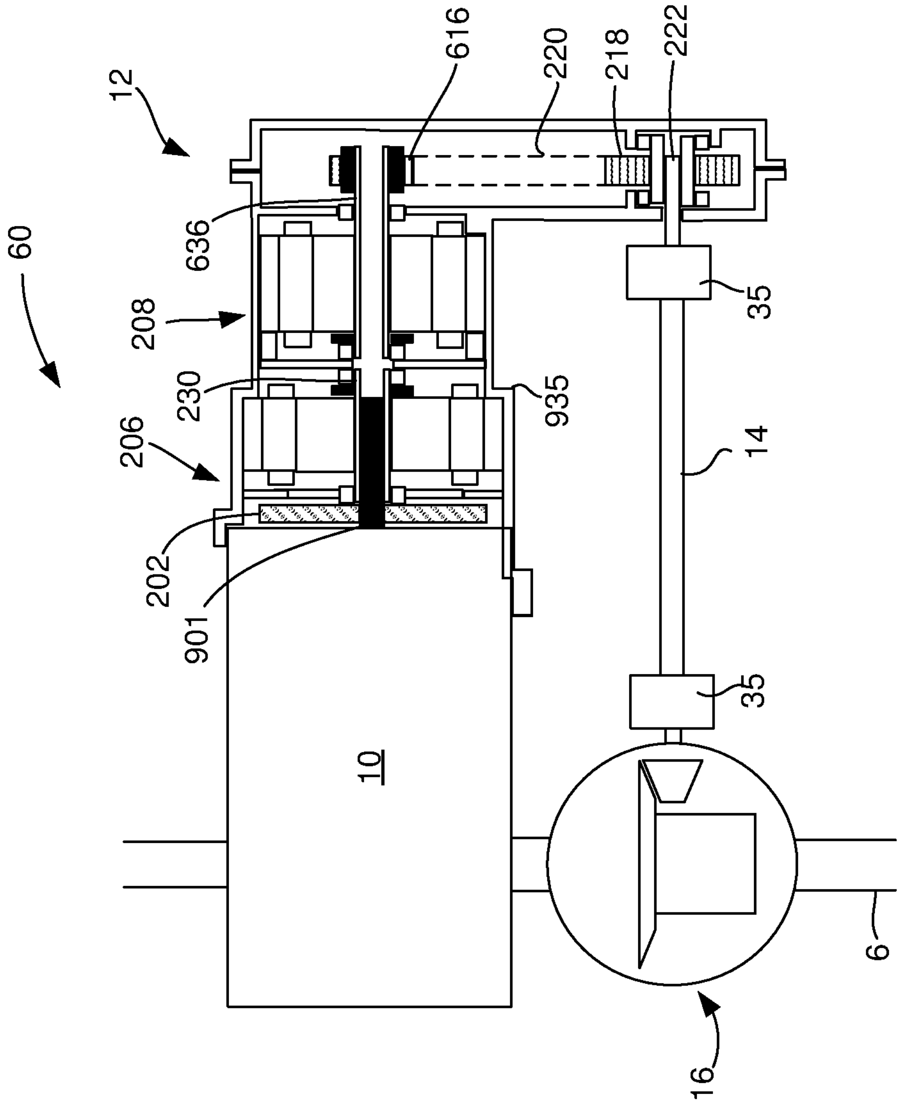

Referring now to FIG. 9, a cut-away diagram of an eighth example of power unit 60 is shown. In this example, many of the components shown in FIG. 8 are shown in FIG. 9. Components in FIG. 9 that are the same as components shown in FIG. 8 are labeled with the same numerical identifiers. Therefore, for the sake of brevity, the description of the same components is omitted.

In this example, the second planetary gear set 210 and the first planetary gear set 204 have been removed as compared to the system that is shown in FIG. 2. Additionally, the power unit in FIG. 9 does not include an engine direct drive shaft. Thus, the system of FIG. 9 provides no gear reduction between internal combustion engine 10, input shaft 901, and first intermediate shaft 230, which is coupled to input shaft 901. Crankshaft of internal combustion engine 10 and rotor of generator 206 cannot be mechanically coupled motor 208. Second intermediate shaft 636 extends through motor 208 and first chain drive sprocket 616. Thus, the configuration of FIG. 9 includes the no gear reduction between the internal combustion engine 10 and the first chain drive sprocket 616. Motor 208 is the sole source of tractive effort in this example.

Figure 10:
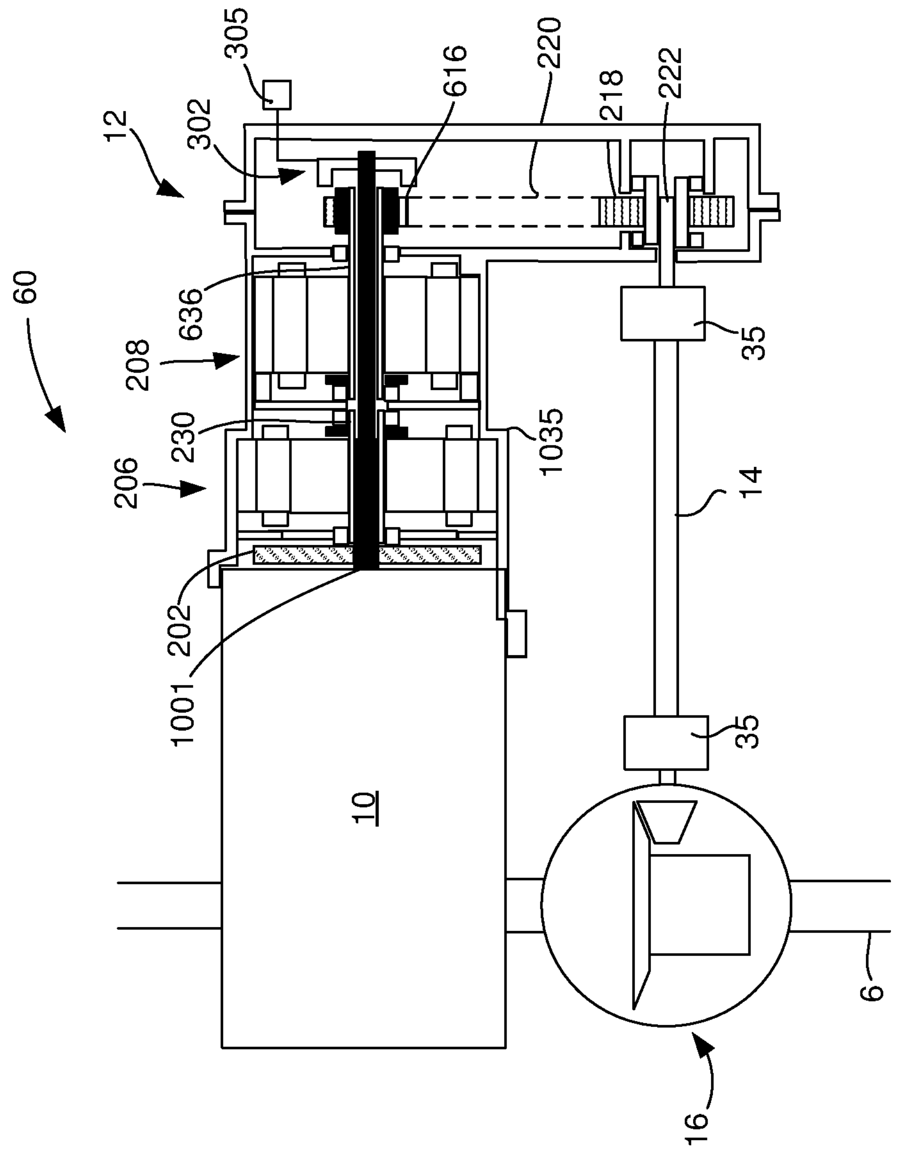

Referring now to FIG. 10, a cut-away diagram of a ninth example of power unit 60 is shown. In this example, many of the components shown in FIG. 9 are shown in FIG. 10. Components in FIG. 10 that are the same as components shown in FIG. 9 are labeled with the same numerical identifiers. Therefore, for the sake of brevity, the description of the same components is omitted.

In this example, the second planetary gear set 210 and the first planetary gear set 204 have been removed as compared to the system that is shown in FIG. 2, but this example includes an engine direct drive shaft 1001. Engine direct drive shaft 1001 extends from internal combustion engine 10 to first chain drive sprocket 616. Thus, the system of FIG. 10 provides no gear reduction between internal combustion engine 10, engine direct drive shaft 1001, and intermediate shaft 230, which is coupled to input shaft 901. However, internal combustion engine 10 and generator 206 may be coupled to motor 208 and first chain drive sprocket 616 via engine direct drive shaft 1001 and coupler 302. Thus, the configuration of FIG. 10 includes the no gear reduction between the internal combustion engine 10 and the first chain drive sprocket 616, but this configuration permits driving of vehicle wheels via internal combustion engine 10.

Figure 11:
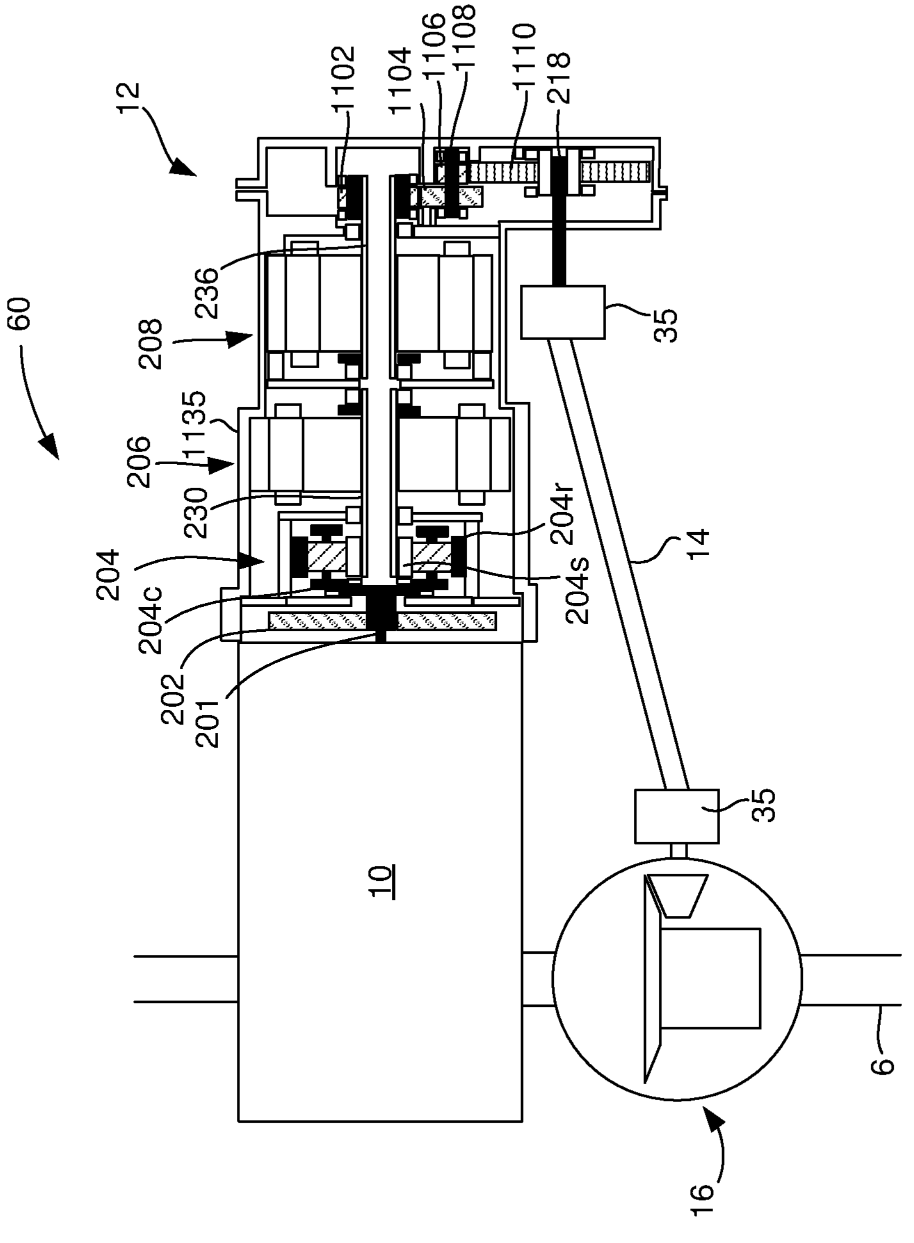

Referring now to FIG. 11, a cut-away diagram of a first example of power unit 60 is shown. In this example power unit, internal combustion engine 10 is directly coupled (e.g., no intervening shafts or gears) to input shaft 201 and input shaft 201 is directly coupled to damper 202. Damper 202 is directly coupled to carrier 204*c* of first planetary gear set 204. First planetary gear set 204 also includes a ring gear 204*r* that is directly coupled to transmission case 235. Further, sun gear 204*s* of first planetary gear set 204 is coupled to first intermediate shaft 230. First intermediate shaft 230 couples first planetary gear set 204 to generator 206. Generator 204 may supply electrical charge to traction battery 100 shown in FIG. 1 and/or motor 208 when a rotor of generator 204 is rotated via internal combustion engine 10. Generator 204 is not mechanically coupled to motor 208 in this example.

Motor 208 is a traction motor that may provide propulsive effort to front wheels 26 as shown in FIG. 1 via steerable front beam axle 6. Motor 208 is directly coupled to second intermediate shaft gear 1102. Second intermediate shaft gear 1102 meshes with first layshaft gear 1104 that is supported via layshaft 1108. Layshaft 1108 also supports second layshaft gear 1106 and second layshaft gear 1106 meshes with output shaft gear 1110. Output shaft gear 1110 rotates with output shaft 222.

In this configuration, power unit 60 may receive an input torque via internal combustion engine 10 and convert the torque to electric charge via generator 204. The electric charge may be delivered to traction motor 208 and/or traction battery 100. Traction motor 208 may provide torque to provide propulsive effort to front wheels 26 by way of layshaft 1108 and gears 1102, 1104, 1106, and 1110.

The first planetary gear set 204 operates as a reduction gear between internal combustion engine 10 and generator 204. The motor 208 may deliver torque to front wheels 26 (as shown in FIG. 1) via transmitting torque through gears that rotate about layshaft 1108 and output shaft 222.

Figure 12:
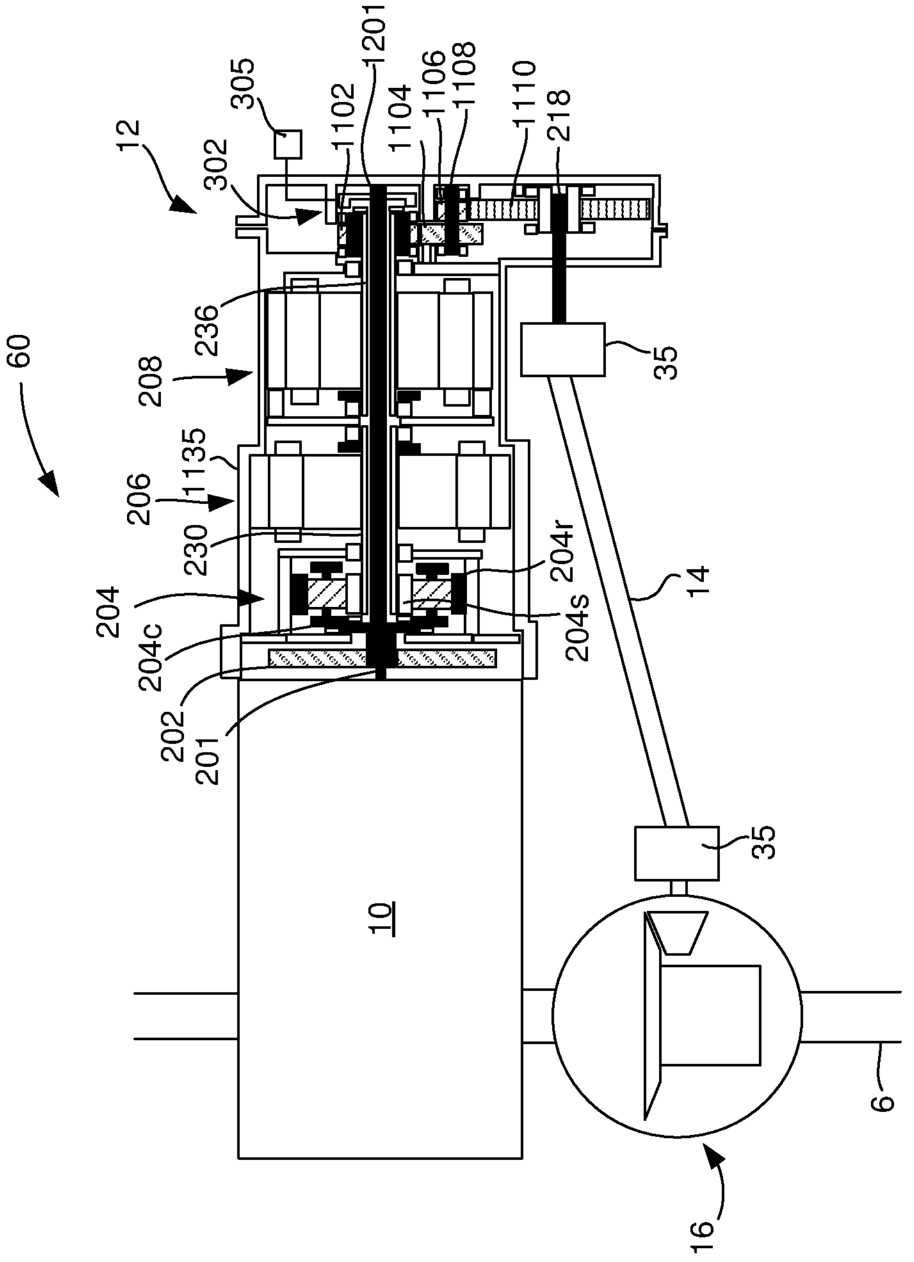

Referring now to FIG. 12, a cut-away diagram of an eleventh example of power unit 60 is shown. In this example, many of the components shown in FIGS. 3 and 11 are shown in FIG. 12. Components in FIG. 12 that are the same as components shown in FIG. 11 are labeled with the same numerical identifiers. Therefore, for the sake of brevity, the description of the same components is omitted.

In this example, there is a first planetary gear set 204, but no chain drive. Additionally, the system of FIG. 12 includes an engine direct drive shaft 1201 that may allow the internal combustion engine 10 to supply torque directly to gears of the layshaft, which in turn may allow internal combustion engine to rotate front wheels 26 shown in FIG. 1. The engine direct drive shaft 1201 couples the carrier of the first planetary gear set to coupler 302. Further, coupler 302 may be selectively engaged and disengaged via actuator 305. Thus, internal combustion engine 10 and traction motor 208 may simultaneously provide torque to second intermediate shaft gear 1102. This allows the internal combustion engine 10 to supply torque to front wheels 26 shown in FIG. 1 and generator 204 simultaneously so that the traction battery may be charged while internal combustion engine 10 is propelling the hybrid vehicle 1 shown in FIG. 1. The generator and the internal combustion engine may rotate at different speeds.

Figure 13:
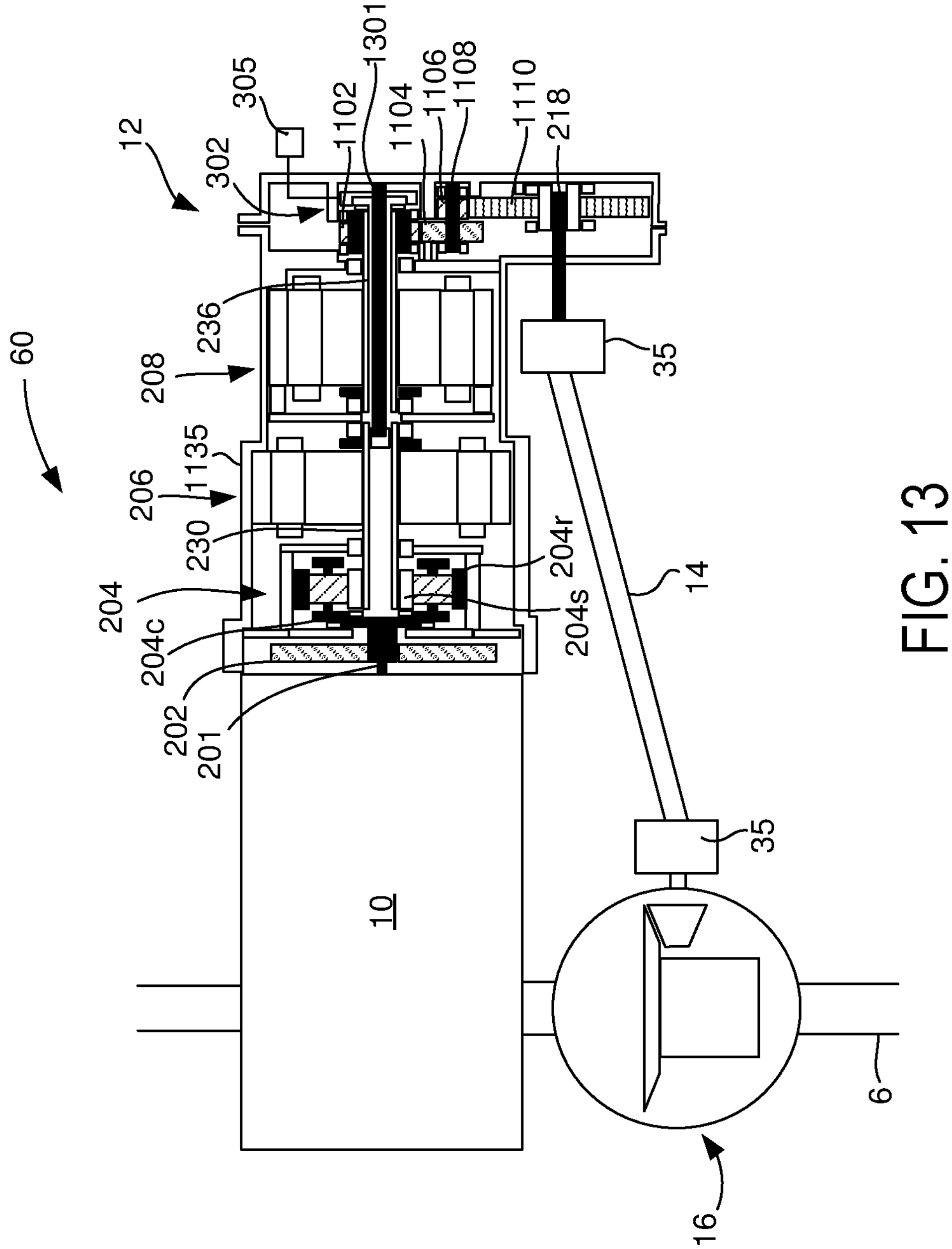

Referring now to FIG. 13, a cut-away diagram of a twelfth example of power unit 60 is shown. In this example, many of the components shown in FIG. 13 are shown in FIG. 12. Components in FIG. 13 that are the same as components shown in FIG. 12 are labeled with the same numerical identifiers. Therefore, for the sake of brevity, the description of the same components is omitted.

In this example, there is an engine direct drive shaft 1301 that may allow the internal combustion engine 10 to supply torque directly to gears of the layshaft, but this engine direct drive shaft is coupled to first intermediate shaft 230, which is coupled to sun gear 204*s*. This arrangement allows internal combustion engine 10 to rotate at a different speed than engine direct drive shaft 1301. Coupler 302 may be selectively engaged and disengaged via actuator 305 to couple engine direct drive shaft 1301 to second intermediate shaft gear 1102. Thus, internal combustion engine 10 and traction motor 208 may simultaneously provide torque to second intermediate shaft gear 1102. This allows the internal combustion engine 10 to supply torque to front wheels 26 shown in FIG. 1 and generator 204 simultaneously so that the traction battery may be charged while internal combustion engine 10 is propelling the hybrid vehicle 1 shown in FIG. 1. The generator and the internal combustion engine may rotate at different speeds.

Figure 14:
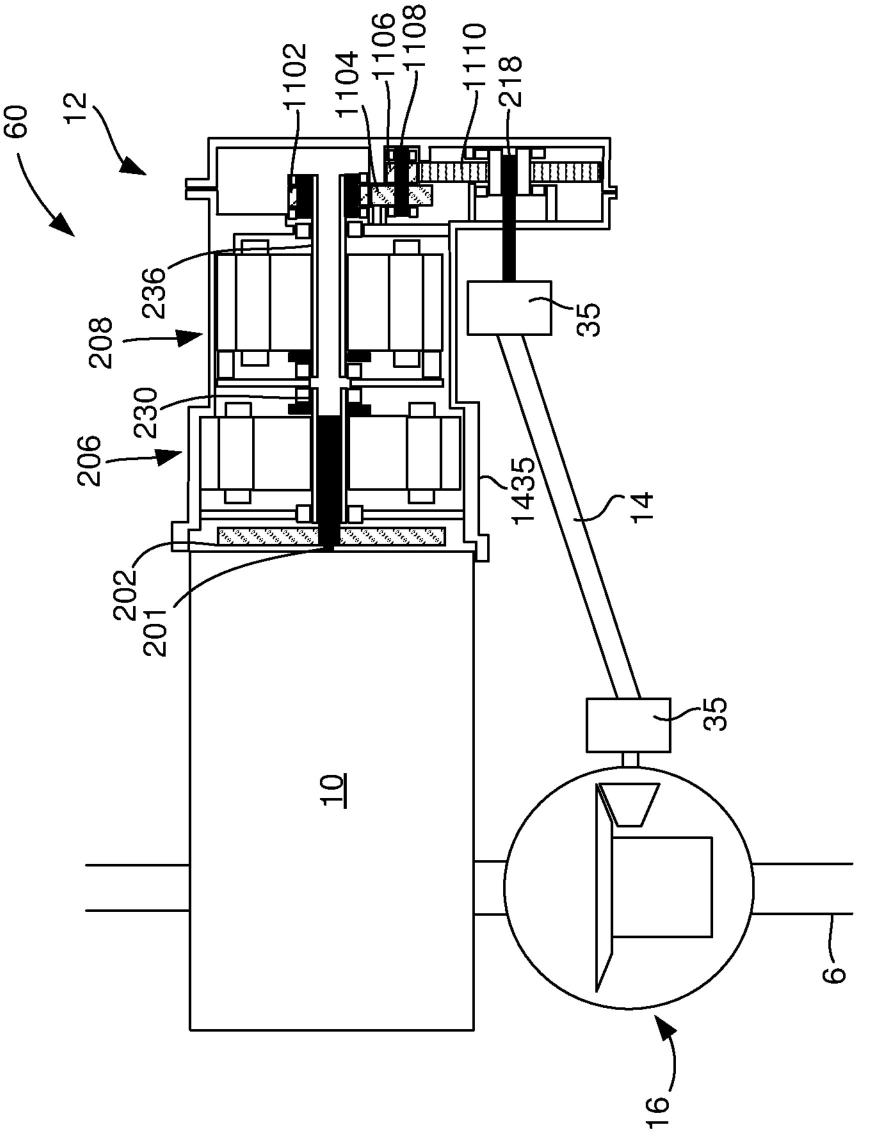

Referring now to FIG. 14, a cut-away diagram of a thirteenth example of power unit 60 is shown. In this example, many of the components shown in FIGS. 9 and 11 are shown in FIG. 14. Components in FIG. 14 that are the same as components shown in FIGS. 9 and 11 are labeled with the same numerical identifiers. Therefore, for the sake of brevity, the description of the same components is omitted.

In this example, the second planetary gear set 210 and the first planetary gear set 204 have been removed and gear drive is substituted for chain drive. Input shaft 201 couples internal combustion engine 10 to generator 204. Second intermediate shaft 236 couples motor 208 to second intermediate shaft gear 1102 and second intermediate shaft gear 1102 meshes with first layshaft gear 1104. Layshaft 1108 transfers torque from first layshaft gear 1104 to second layshaft gear 1106 and second layshaft gear 1106 meshes with output shaft gear 1110. Output shaft gear 1110 rotates with output shaft 222. Accordingly, this example includes a gear reduction from internal combustion engine 10 to generator 206 and gearing between traction motor 208 and output shaft 222. Internal combustion engine and generator 206 may supply electric energy to motor 208 to propel the vehicle.

Figure 15:
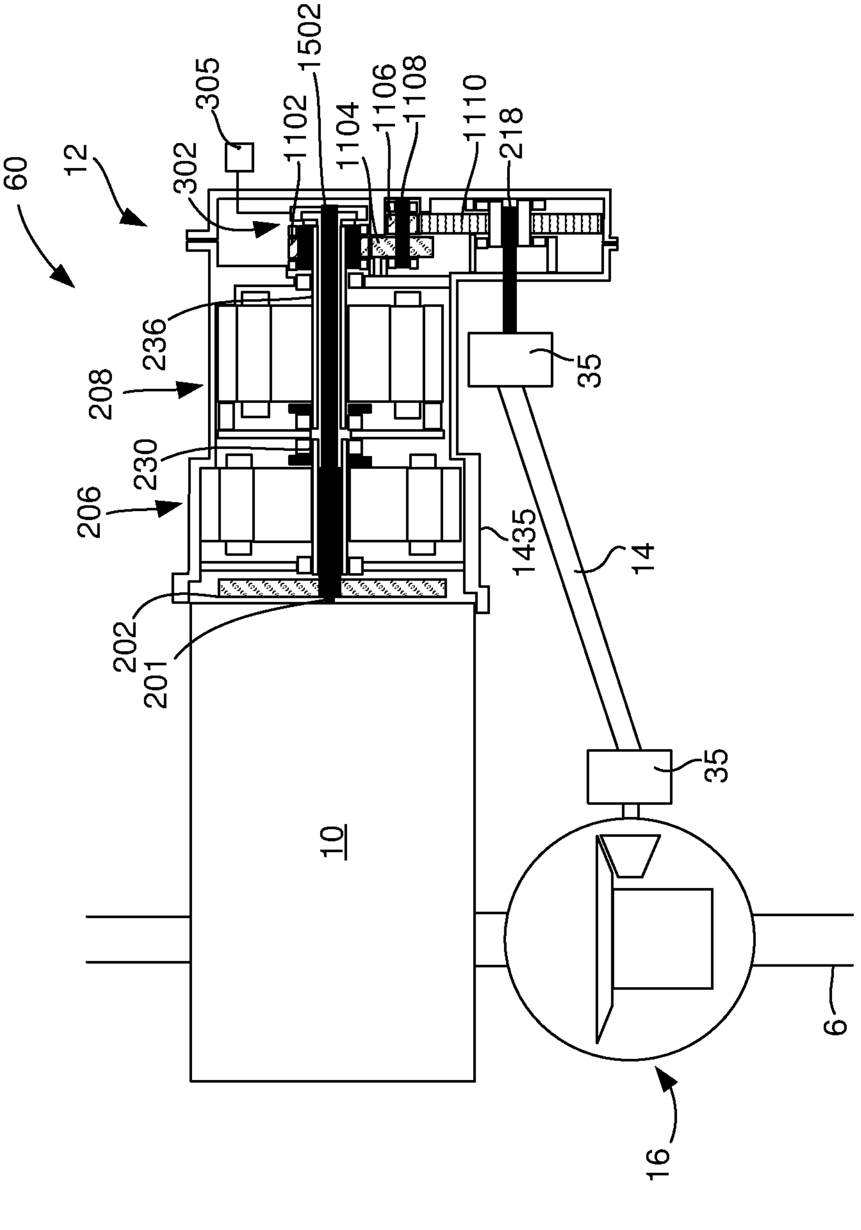

Finally, FIG. 15 shows a cut-away diagram of a fourteenth example of power unit 60. In this example, many of the components shown in FIGS. 3 and 14 are shown in FIG. 15. Components in FIG. 15 that are the same as components shown in FIGS. 3 and 14 are labeled with the same numerical identifiers. Therefore, for the sake of brevity, the description of the same components is omitted.

In this example, a coupler 302, coupler actuator 305, and engine direct drive shaft 1501 allow internal combustion engine 10 to directly drive the second intermediate shaft gear 1102. Torque from traction motor 208 and torque from internal combustion engine 10 may be combined to drive second intermediate shaft gear 1102 and output shaft 222.

Thus, the system of FIGS. 1-15 provides for a vehicle system, comprising: a steerable front beam axle; a rear beam axle; a first vehicle frame rail configured to support a chassis and that extends between the rear beam axle and the steerable front beam axle; a second vehicle frame rail configured to support the chassis and that extends between the rear beam axle and the front beam axle; a power unit configured to generate electric power via output of an internal combustion engine, the power unit also configured to supply propulsive effort to front wheels of the vehicle system; and a traction battery, the traction battery extending continuously laterally (e.g., no breaks or separations in the traction battery housing or case) between the first vehicle frame rail and the second vehicle frame rail. In a first example, the vehicle system includes where the traction battery is incased in a sole housing and where a drive shaft does not extend from the power unit to the rear beam axle. In a second example that may include the first example, the vehicle system includes where the single housing lacks accommodation for a shaft extending at least a part of a distance between the power unit and the rear beam axle. In a third example that may include one or both of the first and second examples, the vehicle system includes where the sole housing extends at least sixty percent of a lateral distance between the first vehicle frame rail and the second vehicle frame rail. In a fourth example that may include one or more of the first through third examples, the vehicle system includes where the front beam axle includes two king-pins. In a fifth example that may include one or more of the first through fourth examples, the vehicle system includes where the sole housing extends between the power unit and the rear beam axle. In a sixth example that may include one or more of the first through fifth examples, the vehicle system includes where the rear beam axle includes an electric machine.

Additionally, the systems of FIGS. 1-15 provide for a vehicle system, comprising: a front beam axle; a rear beam axle; a first vehicle frame rail that extends between the rear beam axle and the front beam axle; a second vehicle frame rail that extends between the rear beam axle and the front beam axle; a power unit configured to generate electric power via output of an internal combustion engine, the power unit also configured to supply propulsive effort to front wheels of the vehicle system, and where a torque path through the power unit changes from a front to rear longitudinal direction to a rear to front longitudinal direction; and a traction battery, the traction battery extending laterally between the first vehicle frame rail and the second vehicle frame rail. In a first example, the vehicle system includes where the power unit includes a first electric machine and a second electric machine. In a second example that may include the first example, the vehicle system includes where the power unit includes two planetary gear sets. In a third example that may include one or both of the first and second examples, the vehicle system includes where the power unit includes a chain drive. In a fourth example that may include one or more of the first through third examples, the vehicle system includes where the power unit includes a coupler to directly couple a dampener to the chain drive.

Figure 16:
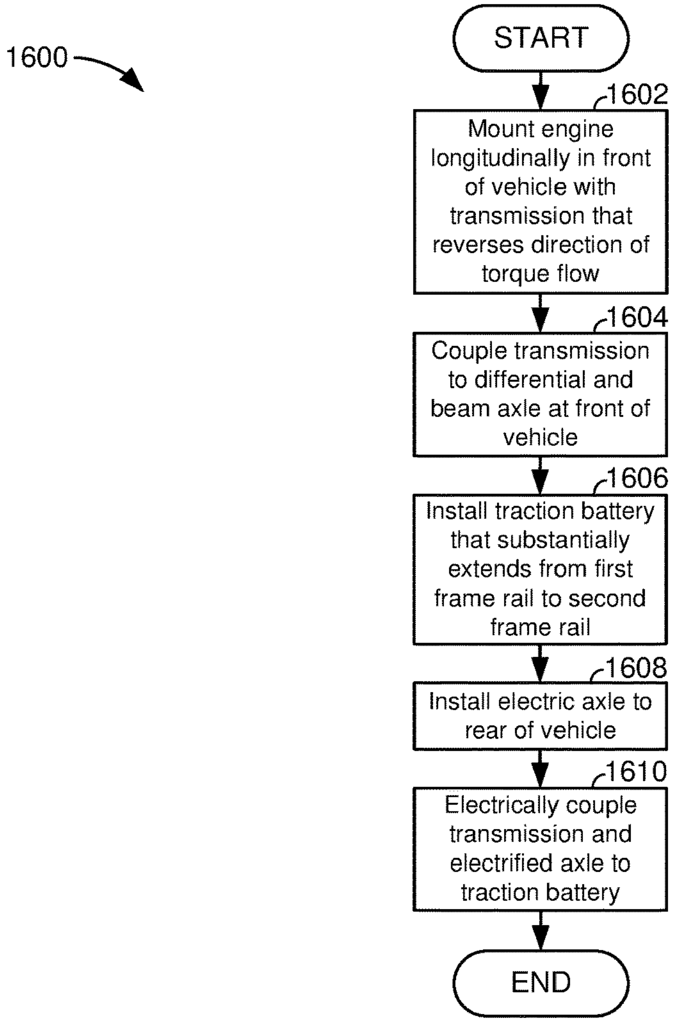
FIG. 16 shows a flowchart of a method for building a hybrid vehicle of the type that is illustrated in FIG. 1.

Turning now to FIG. 16, a method for building and assembling a hybrid vehicle is shown. The method of FIG. 16 may be included as executable instructions in non-transitory memory of one or more controllers. Further, the method of FIG. 16 may be performed via humans and/or an automated assembly system. The method of FIG. 16 may also include actions taken in the physical world to transform operating states of the system of FIGS. 1-15.

At 1602, method 1600 includes mounting an internal combustion engine longitudinally to a front side of a vehicle with a transmission that reverses the direction of torque flow from the front of the vehicle to the rear of the vehicle and back to the front of the vehicle. The engine and transmission may be combined to build a power unit and the power unit may have any of the forms shown in FIGS. 2-15. Method 1600 proceeds to 1604.

At 1604, method 1600 couples the power unit including a transmission to a steerable front beam axle at a front side of the vehicle. Method 1600 proceeds to 1606.

At 1606, method 1600 calls for a traction battery to be installed in a vehicle between to frame rails. The traction battery may extend lateral between the frame rails and the traction battery extend at least sixty percent of the distance between the frame rails. Preferably, the traction battery may extend at least ninety percent of the distance between the frame rails to utilize space for battery pack volume, thereby allowing the battery pack to store larger amounts of charge. Method 1600 proceeds to 1608.

At 1608, method 1600 calls for installing an electrified rear axle to the vehicle. The electrified rear axle may include one or more electric machines, gearing, and an inverter. Method 1600 proceeds to 1610.

At 1610, method 1600 electrically couples the traction battery to the power unit and the electrified rear axle. By electrically coupling the traction battery to the power unit and the electrified rear axle, one or both of the power unit and electrified rear axle may receive electric power from the traction battery and one or both of the power unit and the electrified rear axle may supply electric power to the traction battery. Method 1600 proceeds to exit.

In this way, a power unit may deliver mechanical power from an internal combustion engine or an electric machine to front wheels of a vehicle and rear wheels may receive power from a motor. A traction battery may span a distance between frame rails to increase charge storage capacity in the traction battery and blocking access to a rear axle via a drive shaft, but this limitation may be overcome by giving the internal combustion engine and a generator capability of providing electric power to an electrified rear axle.

The method of FIG. 16 provides for a method for a vehicle, comprising: mounting a power unit longitudinally in the vehicle and coupling the engine to a front beam axle, the engine mounted between a first frame rail and a second frame rail; a rear beam axle; and mounting a traction battery between the first frame rail and the second frame rail, where the traction battery extends at least sixty percent of a lateral distance between the first frame rail and the second frame rail a first vehicle frame rail that extends between the rear beam axle and the front beam axle, and where the traction battery is mounted between the rear beam axle and the front beam axle. In a first example, the method further comprises coupling the power unit to a differential of the front beam axle. In a second example that may include the first example, the method includes where the power unit is coupled to the differential via a drive shaft. In a third example that may include one or both of the first and second examples, the method further comprises electrically coupling the power unit to the traction battery. In a fourth example that may include one or more of the first through third examples, the method further comprises integrating an electric propulsion source with the rear beam axle. In a fifth example that may include one or more of the first through fourth examples, the method further comprises electrically coupling the electric propulsion source to the traction battery. In a sixth example that may include one or more of the first through fifth examples, the method includes where the power unit includes a first electric machine and a second electric machine. In a seventh example that may include one or more of the first through sixth examples, the method includes where the first electric machine is a generator and where the second electric machine is a traction motor.

This concludes the description. The reading of it by those skilled in the art would bring to mind many alterations and modifications without departing from the spirit and the scope of the description. For example, single cylinder, I2, I3, I4, I5, V6, V8, V10, V12 and V16 engines operating in natural gas, gasoline, diesel, or alternative fuel configurations could use the present description to advantage.

The invention claimed is:

1. A vehicle system, comprising:

a steerable front beam axle;

a rear beam axle;

a first vehicle frame rail configured to support a chassis and that extends between the rear beam axle and the steerable front beam axle;

a second vehicle frame rail configured to support the chassis and that extends between the rear beam axle and the steerable front beam axle;

a power unit configured to generate electric power via output of an internal combustion engine, the power unit also configured to supply propulsive effort to front wheels of the vehicle system; and a traction battery, the traction battery extending continuously laterally between the first vehicle frame rail and the second vehicle frame rail.

2. The vehicle system of claim 1, where the traction battery is incased in a sole housing and where a drive shaft does not extend from the power unit to the rear beam axle.

3. The vehicle system of claim 2, where the sole housing lacks accommodation for a shaft extending at least a part of a distance between the power unit and the rear beam axle.

4. The vehicle system of claim 3, where the sole housing extends at least sixty percent of a lateral distance between the first vehicle frame rail and the second vehicle frame rail.

5. The vehicle system of claim 4, where the steerable front beam axle includes two king-pins.

6. The vehicle system of claim 4, where the sole housing extends longitudinally between the power unit and the rear beam axle.

7. The vehicle system of claim 1, where the rear beam axle includes an electric machine.

8. A method for a vehicle, comprising:

mounting a power unit longitudinally in the vehicle and coupling the power unit to a front beam axle, the power unit mounted between a first frame rail and a second frame rail;

a rear beam axle; and mounting a traction battery between the first frame rail and the second frame rail, where the traction battery extends at least sixty percent of a lateral distance between the first frame rail and the second frame rail a first vehicle frame rail that extends between the rear beam axle and the front beam axle, and where the traction battery is mounted between the rear beam axle and the front beam axle.

9. The method of claim 8, further comprising coupling the power unit to a differential of the front beam axle.

10. The method of claim 9, where the power unit is coupled to the differential via a drive shaft.

11. The method of claim 10, further comprising electrically coupling the power unit to the traction battery.

12. The method of claim 11, further comprising integrating an electric propulsion source with the rear beam axle.

13. The method of claim 12, further comprising electrically coupling the electric propulsion source to the traction battery.

14. The method of claim 8, where the power unit includes a first electric machine and a second electric machine.

15. The method of claim 14, where the first electric machine is a generator and where the second electric machine is a traction motor.

16. A vehicle system, comprising:

a front beam axle;

a rear beam axle;

a first vehicle frame rail that extends between the rear beam axle and the front beam axle;

a second vehicle frame rail that extends between the rear beam axle and the front beam axle;

a power unit configured to generate electric power via output of an internal combustion engine, the power unit also configured to supply propulsive effort to front wheels of the vehicle system, and where a torque path through the power unit changes from a front to rear longitudinal direction to a rear to front longitudinal direction; and a traction battery, the traction battery extending laterally between the first vehicle frame rail and the second vehicle frame rail.

17. The vehicle system of claim 16, where the power unit includes a first electric machine and a second electric machine.

18. The vehicle system of claim 17, where the power unit includes two planetary gear sets.

19. The vehicle system of claim 17, where the power unit includes a chain drive.

20. The vehicle system of claim 19, where the power unit includes a coupler to directly couple a dampener to the chain drive.

* * * * *